US012621812B2

(12) United States Patent
Hsieh et al.

(10) Patent No.: US 12,621,812 B2
(45) Date of Patent: \*May 5, 2026

(54) APPARATUSES AND METHODS FOR FLEXIBLE RESOURCE UNIT (RU) ALLOCATION

(71) Applicant: MEDIATEK INC., Hsinchu City (TW)

(72) Inventors: Hung-Tao Hsieh, Hsinchu City (TW); Tung-Sheng Yang, Hsinchu City (TW); Chao-Chun Wang, San Jose, CA (US); Jianhan Liu, San Jose, CA (US); Ying-You Lin, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 337 days.

This patent is subject to a terminal disclaimer.

(21) Appl. No.: 18/347,288

(22) Filed: Jul. 5, 2023

(65) Prior Publication Data

US 2023/0354277 A1 Nov. 2, 2023

Related U.S. Application Data

(63) Continuation-in-part of application No. 17/088,652, filed on Nov. 4, 2020.

(Continued)

(51) Int. Cl.
*H04L 1/00* (2006.01)
*H04W 72/044* (2023.01)
*H04W 72/0446* (2023.01)

(52) U.S. Cl.
CPC ....... *H04W 72/0446* (2013.01); *H04L 1/0003* (2013.01); *H04W 72/046* (2013.01)

(58) Field of Classification Search
CPC ........... H04W 72/046; H04W 72/0446; H04W 72/23; H04W 84/12; H04B 7/02;

(Continued)

(56) References Cited

U.S. PATENT DOCUMENTS

| | | | |
|---|---|---|---|
| 10,701,707 B2 | 6/2020 | Ansley | |
| 11,166,159 B1 | 11/2021 | Berger | |

(Continued)

FOREIGN PATENT DOCUMENTS

| | | |
|---|---|---|
| CN | 110463133 A | 11/2019 |
| KR | 20160048012 A | 5/2016 |
| WO | 2020060145 A1 | 3/2020 |

OTHER PUBLICATIONS

Final Office Action dated Aug. 1, 2023, issued in U.S. Appl. No. 17/088,652.

(Continued)

*Primary Examiner* — Andrew Lee
(74) *Attorney, Agent, or Firm* — McClure, Qualey & Rodack, LLP

(57) ABSTRACT

A station (STA) for communicating with an Access Point (AP) in a wireless communication system is provided. The STA may include a wireless transceiver and a processor. The wireless transceiver may be configured to perform wireless transmission and reception to and from the AP. The processor may be configured to receive allocation information from the AP via the wireless transceiver, wherein the allocation information indicates at least one user block and at least one stream for the STA, wherein each resource unit (RU) in a Physical layer Protocol Data Unit (PPDU) comprises at least one user block, and send Uplink (UL) data or receive Downlink (DL) data in the at least one user block to or from the AP via the wireless transceiver according to the allocation information.

14 Claims, 11 Drawing Sheets

Related U.S. Application Data

(60) Provisional application No. 62/930,692, filed on Nov. 5, 2019.

(58) Field of Classification Search
CPC ... H04L 1/0003; H04L 5/0094; H04L 5/0044; H04L 1/0009; H04L 5/0023; H04L 5/0053
See application file for complete search history.

(56) References Cited

U.S. PATENT DOCUMENTS

| | | | |
|---|---|---|---|
| 11,838,951 B2 | 12/2023 | Jang | |
| 2014/0286238 A1 | 9/2014 | Erceg | |
| 2015/0139089 A1* | 5/2015 | Azizi | H04W 74/04 |
| | | | 370/329 |
| 2016/0014804 A1 | 1/2016 | Merlin | |
| 2016/0128024 A1 | 5/2016 | Frederiks | |
| 2016/0150514 A1* | 5/2016 | Kwon | H04W 74/0816 |
| | | | 370/329 |
| 2016/0330715 A1* | 11/2016 | Chen | H04W 72/04 |
| 2017/0048844 A1* | 2/2017 | Chen | H04W 72/21 |
| 2019/0007973 A1 | 1/2019 | Lou | |
| 2019/0165883 A1 | 5/2019 | Chun | |
| 2019/0238195 A1* | 8/2019 | Liu | H04L 1/0009 |
| 2019/0238288 A1 | 8/2019 | Liu et al. | |
| 2019/0239226 A1* | 8/2019 | Chu | H04L 5/0037 |
| 2019/0281657 A1* | 9/2019 | Kim | H04L 5/0044 |
| 2019/0373569 A1 | 12/2019 | Ram et al. | |
| 2020/0014509 A1 | 1/2020 | Asterjadhi | |
| 2020/0045656 A1 | 2/2020 | Verma | |
| 2020/0076552 A1 | 3/2020 | Cherian | |
| 2020/0137734 A1 | 4/2020 | Chun et al. | |
| 2020/0146052 A1 | 5/2020 | Iwai | |
| 2020/0305024 A1 | 9/2020 | Chen et al. | |
| 2021/0022156 A1 | 1/2021 | Bhanage | |
| 2021/0076420 A1 | 3/2021 | Xin | |
| 2021/0099253 A1* | 4/2021 | Kim | H04L 1/1607 |
| 2021/0127291 A1* | 4/2021 | Chen | H04W 28/0231 |
| 2021/0144696 A1 | 5/2021 | Cariou | |
| 2021/0385006 A1 | 12/2021 | Ryu | |
| 2022/0053559 A1 | 2/2022 | Jang | |
| 2022/0417793 A1* | 12/2022 | Kim | H04L 1/0001 |

OTHER PUBLICATIONS

Chinese language office action dated Apr. 26, 2022, issued in application No. TW 110136812.

Chinese language office action dated Oct. 25, 2024, issued in application No. CN 202111219357.5.

* cited by examiner

Receiving allocation information from the AP via the wireless transceiver, wherein the allocation information indicates at least one user block and at least one stream for the STA ~S1410

Sending UL data or receive DL data in the at least one user block to or from the AP via the wireless transceiver according to the allocation information ~S1420

APPARATUSES AND METHODS FOR FLEXIBLE RESOURCE UNIT (RU) ALLOCATION

CROSS REFERENCE TO RELATED APPLICATIONS

This application is a Continuation-In-Part of pending U.S. patent application Ser. No. 17/088,652 filed on Nov. 4, 2020, which claims priority of U.S. Provisional Application No. 62/930,692, filed on Nov. 5, 2019 and U.S. Provisional Application No. 63/367,922, filed on Jul. 8, 2022. The entirety of which is incorporated by reference herein.

BACKGROUND OF THE APPLICATION

Field of the Application

The application generally relates to wireless communications, and more particularly, to apparatuses and methods for flexible Resource Unit (RU) allocation.

Description of the Related Art

With growing demand for ubiquitous computing and networking, various wireless technologies have been developed, including Wireless-Fidelity (Wi-Fi) which is a Wireless Local Area Network (WLAN) technology allowing mobile devices, such as a smartphone, a smart pad, a laptop computer, a portable multimedia player, an embedded apparatus, or the like, to obtain wireless services in a frequency band of 2.4 GHz, 5 GHz, 6 Gz or 60 GHz.

The Institute of Electrical and Electronics Engineers (IEEE) has commercialized or developed various technological standards since an initial WLAN technology is supported using frequencies of 2.4 GHz. For example, IEEE 802.11ac supports Multi-User (MU) transmission using spatial degrees of freedom via a MU-Multiple Input-Multiple-Output (MU-MIMO) scheme in a downlink (DL) direction from an Access Point (AP) to Stations (STAs). To improve performance felt by users demanding high-capacity and high-rate services, IEEE 802.11ax has been proposed, which uses both Orthogonal Frequency Division Multiple Access (OFDMA) and/or MU-MIMO in both DL and uplink (UL) directions. That is, in addition to supporting frequency and spatial multiplexing from an AP to multiple STAs, transmissions from multiple STAs to the AP are also supported in IEEE 802.11ax.

In IEEE 802.11ax, a Resource Unit (RU) refers a group of 78.125 KHz bandwidth subcarriers (tones) used in both DL and UL transmissions for a single STA, and a Multi-User-Physical layer Protocol Data Unit (MU-PPDU) may carry multiple RUs, allowing multiple users to access an AP simultaneously and efficiently.

However, according to the IEEE 802.11ax standards, each RU in an MU-PPDU can only be allocated to a single STA. When some of the STAs aggregated in an MU-PPDU for OFDMA transmission have only a small amount of traffic to send/receive, padding bits will be inserted in the RUs, as shown in FIG. 1, which will inevitably cause a waste of radio resources and decrease the overall system performance.

Therefore, it is desirable to have a more efficient way of RU allocation for the next generation of IEEE 802.11 systems.

BRIEF SUMMARY OF THE APPLICATION

In order to solve the aforementioned problem, the present application proposes a more flexible way of RU allocation for IEEE 802.11be systems or any further generation of IEEE 802.11be systems, in which multiple station (STA) are allowed to share one Resource Unit (RU) in a Multi-User-Physical layer Protocol Data Unit (MU-PPDU). Advantageously, each RU can be more efficiently used among the multiple STAs aggregated in an MU-PPDU for Orthogonal Frequency Division Multiple Access (OFDMA) transmission, thereby improving radio resource utilization and overall system performance.

In one aspect of the application, a STA for communicating with an Access Point (AP) in a wireless communication system is provided. The STA may comprise a wireless transceiver and a processor. The wireless transceiver may be configured to perform wireless transmission and reception to and from the AP. The processor may be configured to receive allocation information from the AP via the wireless transceiver, wherein the allocation information indicates at least one user block and at least one stream for the STA, wherein each resource unit (RU) in a Physical layer Protocol Data Unit (PPDU) comprises at least one user block, and send Uplink (UL) data or receive Downlink (DL) data in the at least one user block to or from the AP via the wireless transceiver according to the allocation information.

In another aspect of the application, a method, executed by a STA for communicating with an Access Point (AP) in a wireless communication system, is provided. The method comprises the following steps: receiving, by the STA, allocation information from the AP via the wireless transceiver, wherein the allocation information indicates at least one user block and at least one stream for the STA, wherein each resource unit (RU) in a Physical layer Protocol Data Unit (PPDU) comprises at least one user block; and sending, by the STA, Uplink (UL) data or receive Downlink (DL) data in the at least one user block to or from the AP via the wireless transceiver according to the allocation information.

In yet another aspect of the application, an AP for communicating with a plurality of stations (STAs) in a wireless communication system is provided. The AP comprises a wireless transceiver and a processor. The wireless transceiver is configured to perform wireless transmission and reception to and from the STAs. The processor is configured to send allocation information to the STAs via the wireless transceiver, wherein the allocation information indicates at least one user block and at least one stream for each STA, wherein each resource unit (RU) in a Physical layer Protocol Data Unit (PPDU) comprises at least one user block, and receive Uplink (UL) data or send Downlink (DL) data in the at least one user block from or to each STA via the wireless transceiver according to the allocation information.

Other aspects and features of the present application will become apparent to those with ordinary skill in the art upon review of the following descriptions of specific embodiments of the methods for flexible RU allocation.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 2:
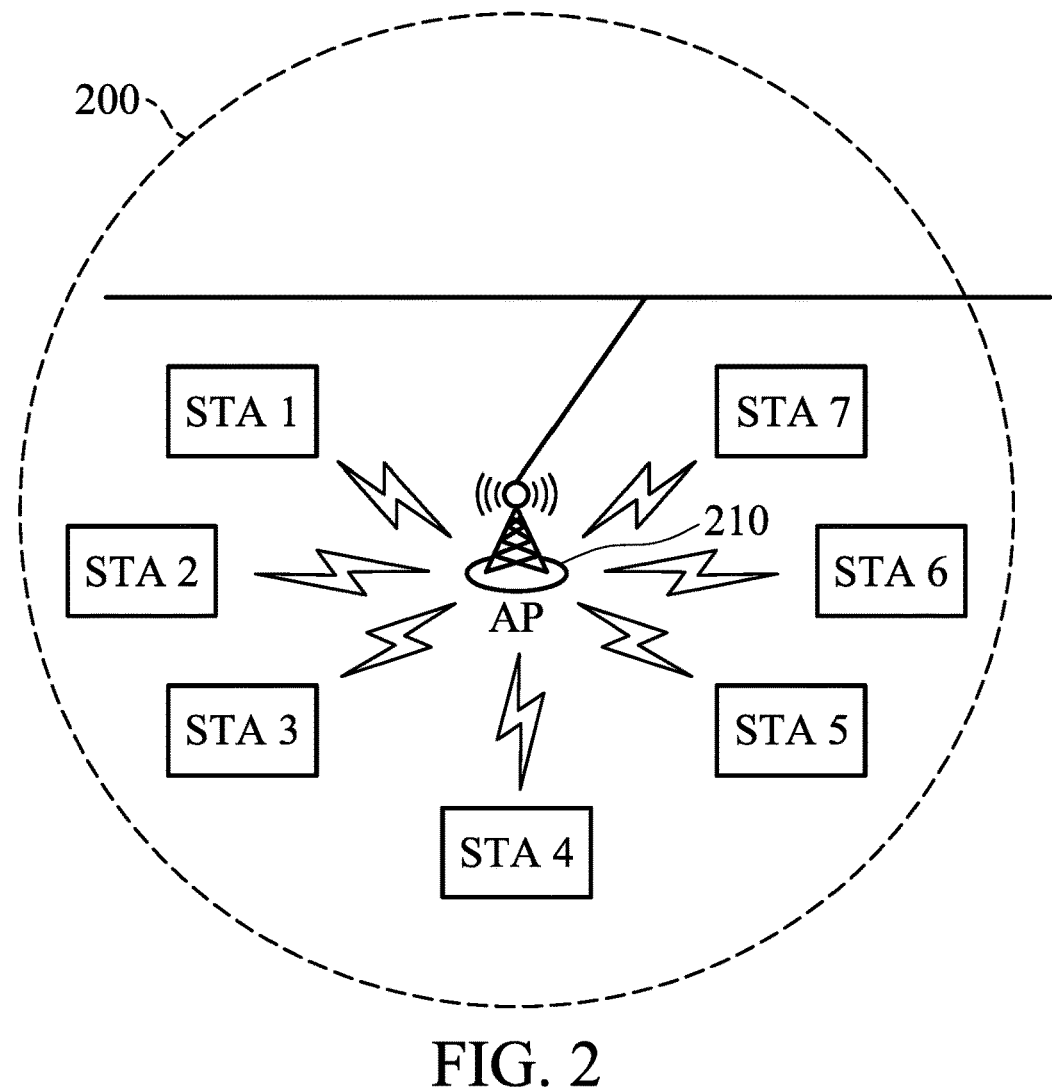
FIG. 2 is a block diagram of a wireless communication system according to an embodiment of the application.

FIG. 2 is a block diagram of a wireless communication system according to an embodiment of the application.

As shown in FIG. 2, the wireless communication system 200 includes an Access Point (AP) 210 and a plurality of stations (STAs) 1~7. The AP 210 is an entity compatible with the Institute of Electrical and Electronics Engineers (IEEE) 802.11 standards to provide and manage the access to the wireless medium for the STAs 1~7.

In one embodiment, the AP 210 may be an Extremely High Throughput (EHT) AP which is compatible with the IEEE 802.11be standards.

In another embodiment, the AP 210 may be an AP which is compatible with any IEEE 802.11 standards later than 802.11be.

Each of the STAs 1~7 may be a mobile phone (e.g., feature phone or smartphone), a panel Personal Computer (PC), a laptop computer, or any computing device, as long as it is compatible with the same IEEE 802.11 standards as the AP 210. Each of the STAs 1~7 may associate and communicate with the AP 210 to send or receive data in an uplink (UL) or downlink (DL) Multi-User-Physical layer Protocol Data Unit (MU-PPDU).

At a given point in time, multiple STAs 1~7, in the wireless communication system 100, may wish to send/receive data. Instead of scheduling medium access for the STAs 1~7 in different respective UL/DL time intervals, the AP 210 may schedule medium access for the STAs 1~7 to support UL/DL MU transmission techniques, according to which the STAs 1~7 may send/receive MU-PPDUs to the AP 210 simultaneously during a given time interval.

For example, by using DL MU OFDMA techniques during a given DL time interval, the STAs 1~7 may receive DL MU-PPDUs from the AP 210, and in each DL MU-PPDU, the same or different Resource Units (RUs) may be allocated to the STAs 1~7.

In another example, by using UL MU Multiple-Input Multiple-Output (MU-MIMO) techniques during a given UL time interval, the STAs 1~7 may send UL MU-PPDUs to the AP 210 via different respective spatial streams allocated by the AP 210, and in each UL MU-PPDU, the same or different RUs may be allocated to the STAs 1~7.

To be more specific, each RU in an MU-PPDU may be divided into one or more user blocks, and each user block is allocated to a respective STA for OFDMA transmission or reception. That is, multiple STAs are allowed to share one RU in an MU-PPDU.

To manage the RU allocations within the MU-PPDUs, the AP 210 may provide allocation information indicating the user blocks for multiple STAs in each RU of an MU-PPDU.

In one embodiment, the allocation information may be provided in the header of a DL MU-PPDU.

In another embodiment, the allocation information may be provided in the trigger frame of an UL PPDU before the UL transmission of the STAs 1~7.

It should be understood that the components described in the embodiment of FIG. 2 are for illustrative purposes only and are not intended to limit the scope of the application. For example, the wireless communication system 200 may include more or fewer STAs.

Figure 3:
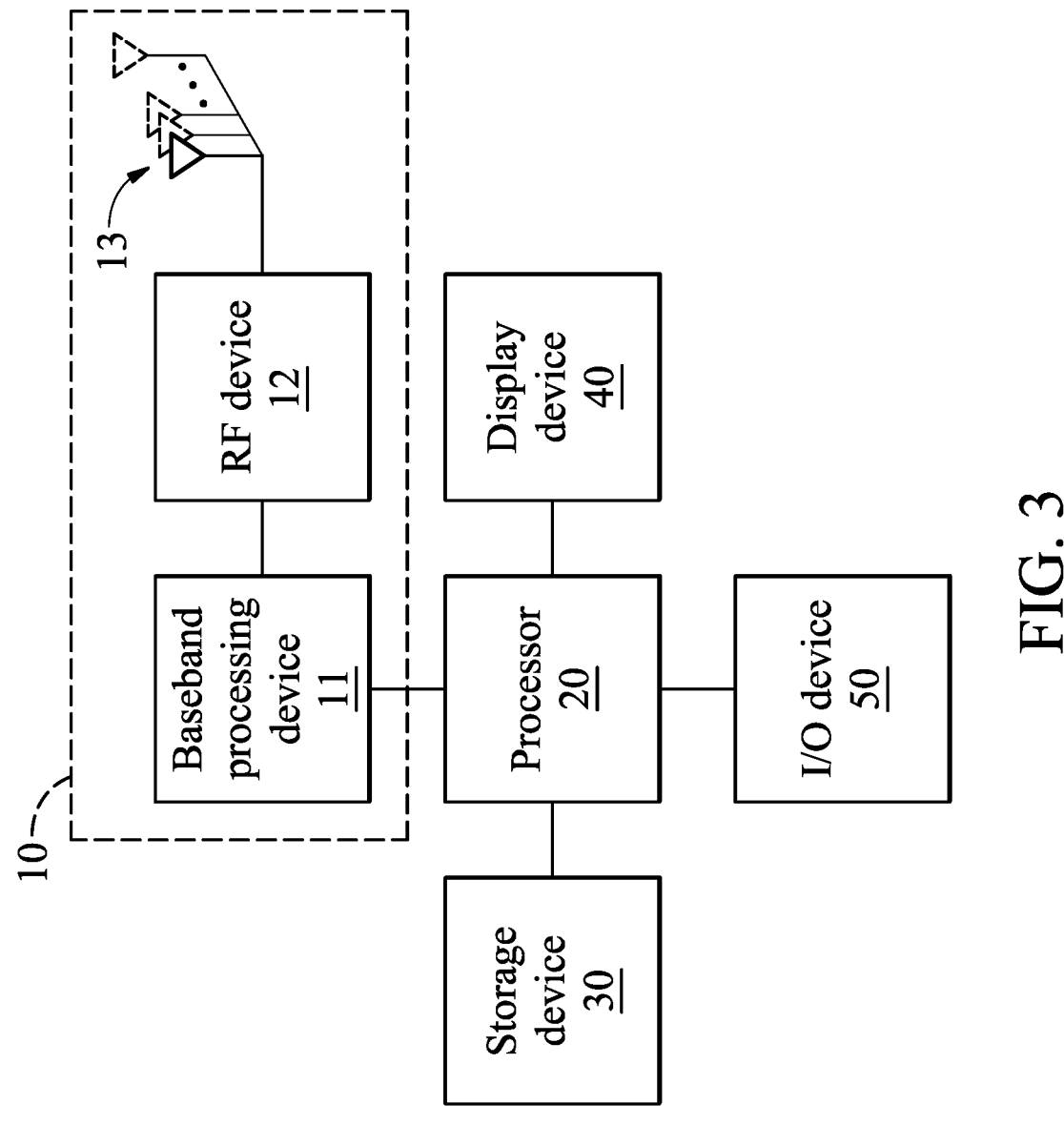
FIG. 3 is a block diagram illustrating an STA according to an embodiment of the application.

FIG. 3 is a block diagram illustrating an STA according to an embodiment of the application.

As shown in FIG. 3, an STA may include a wireless transceiver 10, a processor 20, a storage device 30, a display device 40, and an Input/Output (I/O) device 50.

The wireless transceiver 10 is configured to perform wireless transmission and reception to and from the AP 210. For example, the wireless transceiver 10 may be a Wi-Fi chip.

Specifically, the wireless transceiver 10 may include a baseband processing device 11, a Radio Frequency (RF) device 12, and antenna 13, wherein the antenna 13 may include an antenna array for UL/DL Multiple Input-Multiple-Output (MIMO).

The baseband processing device 11 is configured to perform baseband signal processing, such as Analog-to-Digital Conversion (ADC)/Digital-to-Analog Conversion (DAC), gain adjusting, modulation/demodulation, encoding/decoding, and so on. The baseband processing device 11 may contain multiple hardware components, such as a baseband processor, to perform the baseband signal processing.

The RF device 12 may receive RF wireless signals via the antenna 13, convert the received RF wireless signals to baseband signals, which are processed by the baseband processing device 11, or receive baseband signals from the baseband processing device 11 and convert the received baseband signals to RF wireless signals, which are later transmitted via the antenna 13. The RF device 12 may also contain multiple hardware devices to perform radio frequency conversion. For example, the RF device 12 may include a mixer to multiply the baseband signals with a carrier oscillated in the radio frequency of the supported cellular technologies, wherein the radio frequency may be 2.4 GHz, 5 GHz, or 60 GHz utilized in the Wi-Fi technology, or any radio frequency utilized in the future evolution of the Wi-Fi technology.

The processor 20 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 10 for wireless communications with the AP 210, storing and retrieving data (e.g., program code) to and from the storage device 30, sending a series of frame data (e.g. representing text messages, graphics, images, etc.) to the display device 40, and receiving user inputs or outputting signals via the I/O device 50.

In particular, the processor 20 coordinates the aforementioned operations of the wireless transceiver 10, the storage device 30, the display device 40, and the I/O device 50 for performing the method of the present application.

In another embodiment, the processor 20 may be incorporated into the baseband processing device 11, to serve as a baseband processor.

As will be appreciated by persons skilled in the art, the circuits of the processor 20 may include transistors that are configured in such a way as to control the operation of the circuits in accordance with the functions and operations described herein. As will be further appreciated, the specific structure or interconnections of the transistors may be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing data, instructions, and/or program code of applications, communication protocols, and/or the method of the present application.

The display device 40 may be a Liquid-Crystal Display (LCD), a Light-Emitting Diode (LED) display, an Organic LED (OLED) display, or an Electronic Paper Display (EPD), etc., for providing a display function. Alternatively, the display device 40 may further include one or more touch sensors for sensing touches, contacts, or approximations of objects, such as fingers or styluses.

The I/O device 50 may include one or more buttons, a keyboard, a mouse, a touch pad, a video camera, a microphone, and/or a speaker, etc., to serve as the Man-Machine Interface (MMI) for interaction with users.

It should be understood that the components described in the embodiment of FIG. 3 are for illustrative purposes only and are not intended to limit the scope of the application. For example, an STA may include more components, such as another wireless transceiver for providing telecommunication services, a Global Positioning System (GPS) device for use of some location-based services or applications, and/or a battery for powering the other components of the STA, etc. Alternatively, an STA may include fewer components. For example, the STA may not include the display device 40 and/or the I/O device 50.

Figure 4:
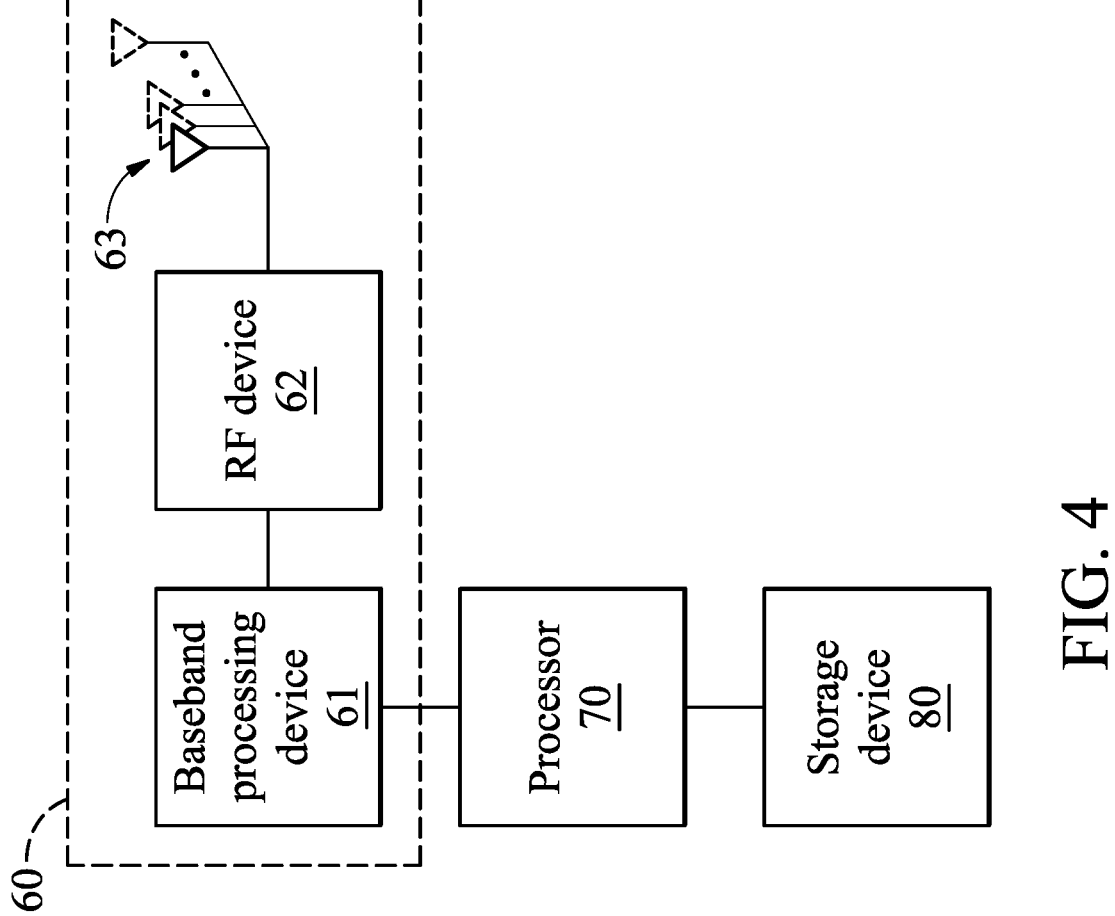
FIG. 4 is a block diagram illustrating an AP according to an embodiment of the application.

FIG. 4 is a block diagram illustrating an AP according to an embodiment of the application.

As shown in FIG. 4, an AP may include a wireless transceiver 60, a processor 70, and a storage device 80.

The wireless transceiver 60 is configured to perform wireless transmission and reception to and from one or more STAs (e.g., the STAs 1~7). For example, the wireless transceiver 60 may be a Wi-Fi chip.

Specifically, the wireless transceiver 60 may include a baseband processing device 61, an RF device 62, and antenna 63, wherein the antenna 63 may include an antenna array for UL/DL MU-MIMO.

The baseband processing device 61 is configured to perform baseband signal processing, such as ADC/DAC, gain adjusting, modulation/demodulation, encoding/decoding, and so on. The baseband processing device 61 may contain multiple hardware components, such as a baseband processor, to perform the baseband signal processing.

The RF device 62 may receive RF wireless signals via the antenna 63, convert the received RF wireless signals to baseband signals, which are processed by the baseband processing device 61, or receive baseband signals from the baseband processing device 61 and convert the received baseband signals to RF wireless signals, which are later transmitted via the antenna 63. The RF device 62 may also contain multiple hardware devices to perform radio frequency conversion. For example, the RF device 62 may include a mixer to multiply the baseband signals with a carrier oscillated in the radio frequency of the supported cellular technologies, wherein the radio frequency may be 2.4 GHz, 5 GHz, or 60 GHz utilized in the Wi-Fi technology, or any radio frequency utilized in the future evolution of the Wi-Fi technology.

The processor 70 may be a general-purpose processor, an MCU, an application processor, a DSP, a GPH/HPU/NPU, or the like, which includes various circuits for providing the functions of data processing and computing, controlling the wireless transceiver 60 for wireless communications with the STAs 1~7, and storing and retrieving data (e.g., program code) to and from the storage device 80.

In particular, the processor 70 coordinates the aforementioned operations of the wireless transceiver 60 and the storage device 80 for performing the method of the present application.

In another embodiment, the processor 70 may be incorporated into the baseband processing device 61, to serve as a baseband processor.

As will be appreciated by persons skilled in the art, the circuits of the processor 70 may include transistors that are configured in such a way as to control the operation of the circuits in accordance with the functions and operations described herein. As will be further appreciated, the specific structure or interconnections of the transistors may be determined by a compiler, such as an RTL compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 80 may be a non-transitory machine-readable storage medium, including a memory, such as a FLASH memory or a NVRAM, or a magnetic storage device, such as a hard disk or a magnetic tape, or an optical disc, or any combination thereof for storing data, instructions, and/or program code of applications, communication protocols, and/or the method of the present application.

It should be understood that the components described in the embodiment of FIG. 4 are for illustrative purposes only and are not intended to limit the scope of the application. For example, an AP may include more components, such as a display device for providing a display function, and/or an I/O device for providing an MMI for interaction with users.

Figures 5, 6:
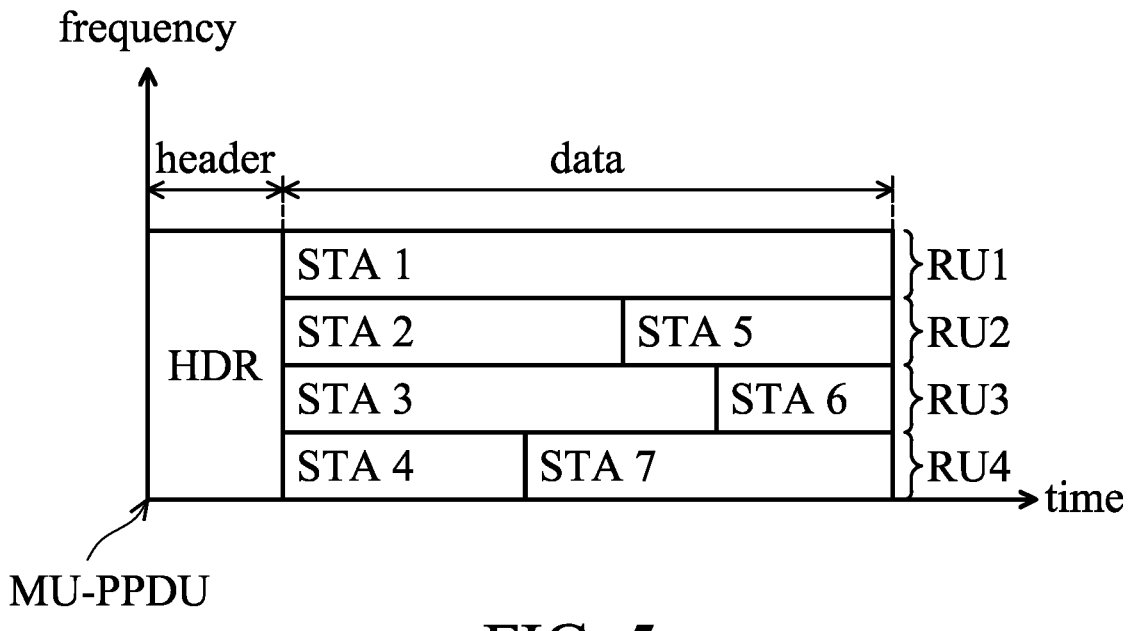
FIG. 5 is a schematic diagram illustrating the RU allocation of a DL/UL MU-PPDU according to an embodiment of the application.
FIG. 6 is a schematic diagram illustrating the RU allocation of a DL MU-PPDU according to an embodiment of the application.

FIG. 5 is a schematic diagram illustrating the RU allocation of a DL/UL MU-PPDU according to an embodiment of the application.

As shown in FIG. 5, the data field of the MU-PPDU may include multiple RUs (e.g., 4 RUs).

Each RU denotes a group of 78.125 KHz bandwidth subcarriers (tones) used in DL/UL transmissions. With OFDMA, different transmit powers may be applied to different RUs. Although there are 4 RUs exemplified in this embodiment for the convenience of illustration, there may be maximum of 9 RUs for 20 MHz bandwidth, 18 in case of 40 MHz, or more in case of 80 or 160 MHz bandwidth. The RUs enable an AP (e.g., the AP 210) to allow multiple STAs to access it simultaneously and efficiently.

Specifically, RU1 is allocated to STA 1 alone, RU2 is allocated to STAs 2 and 5, RU3 is allocated to STAs 3 and 6, and RU4 is allocated to STAs 4 and 7. To further clarify, each of RU2~RU4 is divided into multiple user blocks, each of which is allocated to a respective STA. In other words, multiple STAs are allowed to share a single RU in an MU-PPDU.

Figure 1:
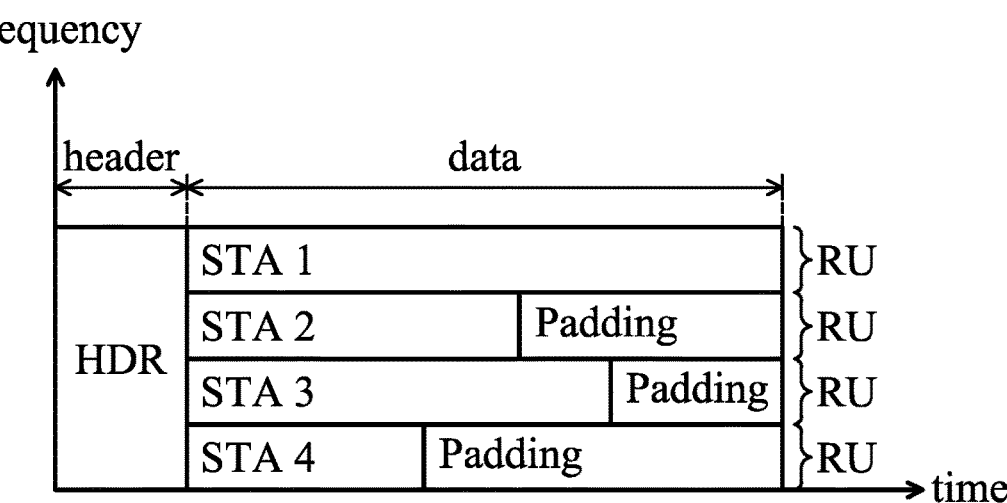
FIG. 1 is a schematic diagram illustrating RU allocation of an MU-PPDU according to the conventional practice.

It should be noted that, in contrast to the RU allocation applied in the conventional practice (as shown in FIG. 1), the time-frequency resources not used by the first STA in each RU are allocated for use of another STA, instead of being inserted with padding bits.

FIG. 6 is a schematic diagram illustrating the RU allocation of a DL MU-PPDU according to an embodiment of the application.

As shown in FIG. 6, the data field of the DL MU-PPDU may include multiple RUs (e.g., 4 RUs). Specifically, RU1 is allocated to STAs 1 and 2, RU2 is allocated to STAs 2 and 5, RU3 is allocated to STAs 3, 4, and 6, and RU4 is allocated to STAs 4 and 7.

Please note that, in this embodiment, an STA may be allocated with multiple user blocks in different RUs, and the user blocks for the same STA in different RUs are allowed to overlap in the time domain. For example, STA 2 is allocated with the second user block in RU1 and the first user block in RU2, wherein the user block for STA 2 in RU1 and the user block for STA 2 in RU2 overlap in the time domain.

Alternatively, the user blocks for the same STA in different RUs may not overlap in the time domain. For example, STA 4 is allocated with the second user block in RU3 and the first user block in RU4, wherein the user block for STA 4 in RU3 and the user block for STA 4 in RU4 do not overlap in the time domain.

It should be understood that the rule of whether the user blocks for the same STA in different RUs are allowed to overlap in the time domain may remain the same for all STAs within a DL MU-PPDU. That is, in one embodiment, the user blocks for the same STA in different RUs of a DL MU-PPDU are allowed to overlap in the time domain, while in another embodiment, the user blocks for the same STA in different RUs of a DL MU-PPDU are not allowed to overlap in the time domain.

Figure 7:
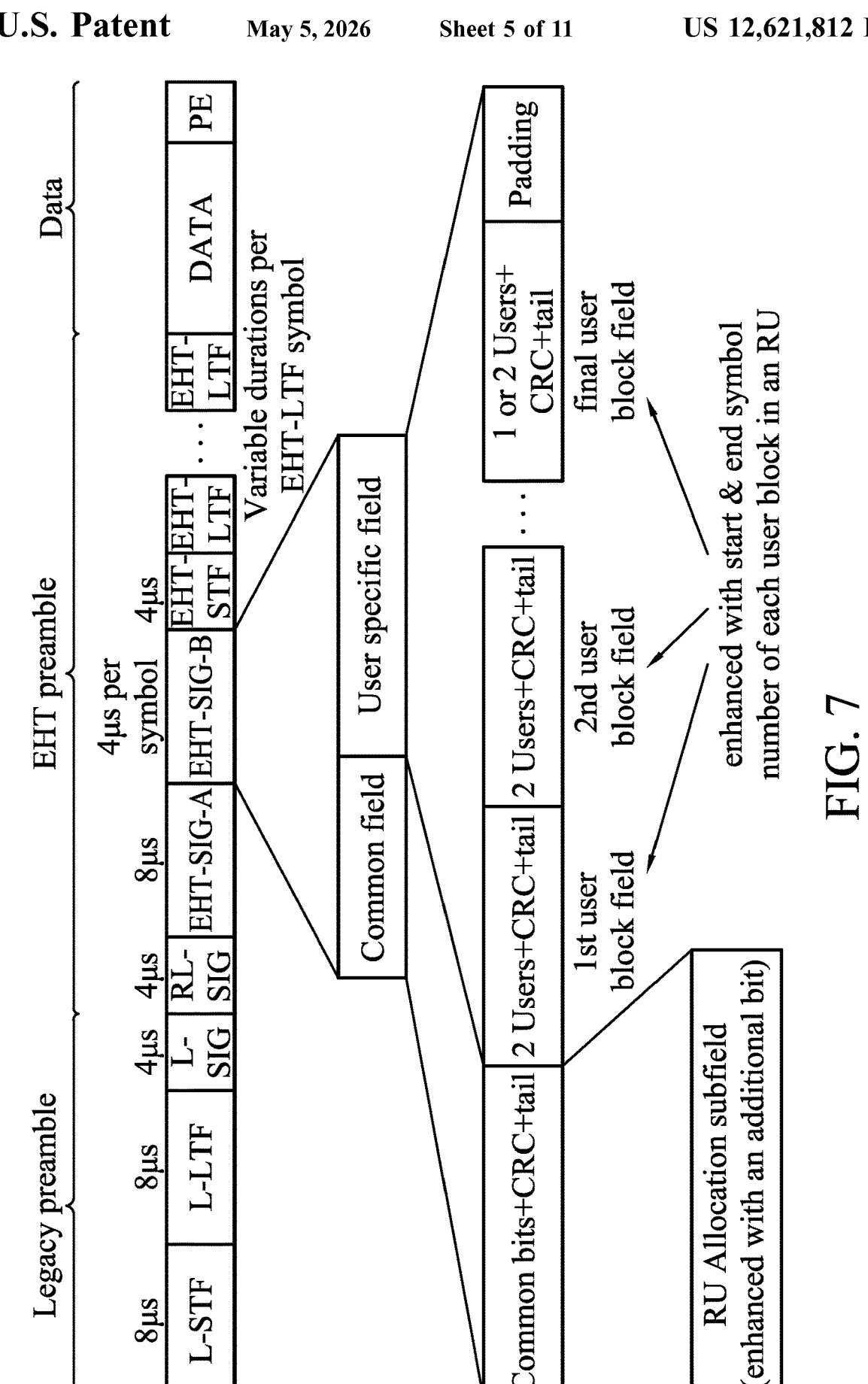
FIG. 7 is a schematic diagram illustrating the provision of the allocation information for RU allocation in the header of a DL MU-PPDU according to an embodiment of the application.

FIG. 7 is a schematic diagram illustrating the provision of the allocation information for RU allocation in the header of a DL MU-PPDU according to an embodiment of the application.

As shown in FIG. 7, the header of the DL MU-PPDU may include a legacy (non-EHT) preamble and an EHT preamble. The legacy preamble may include the L-STF, L-LTF and L-SIG, each of which is decodable by legacy devices and is included for backward compatibility and coexistence with the legacy devices, while the EHT preamble can only be decoded by 802.11be devices.

Specifically, the EHT preamble may include the RL-SIG, EHT-SIG-A, EHT-SIG-B, EHT-STF, EHT-LTF, wherein the allocation information for RU allocation may be provided in the EHT-SIG-B field.

The EHT-SIG-B field may include a common field and a user specific field. The common field may include an RU allocation subfield to specify the RU assignment and the number of users per RU for each 20 MHz bandwidth segment for MU-MIMO cases or for MU-OFDMA multiplexing cases.

The RU Allocation subfield in the common field of EHT-SIG-B may consist of 8 bits that indicate this information for each 20 MHz PPDU bandwidth.

It should be noted that, in the present application, an additional bit is added to each RU Allocation subfield, wherein the additional bit is used to indicate MU-OFDMA multiplexing. For example, the additional bit may be added to the start of the RU Allocation subfield, and if this bit is set, it means that MU-OFDMA multiplexing with the flexible RU allocation is enabled and the rest bits indicate the RU assignment and the number of users (i.e., STAs) per RU. Otherwise, if this bit is not set, it means that MU-OFDMA multiplexing with the flexible RU allocation is disabled.

The user specific field may include multiple user block fields, each of which includes two new subfields to indicate the start symbol number and the end symbol number of each user block in an RU.

With the enhanced RU Allocation subfield and the enhanced user block fields, the allocation information for RU allocation of a DL MU-PPDU is determined.

Figure 8:
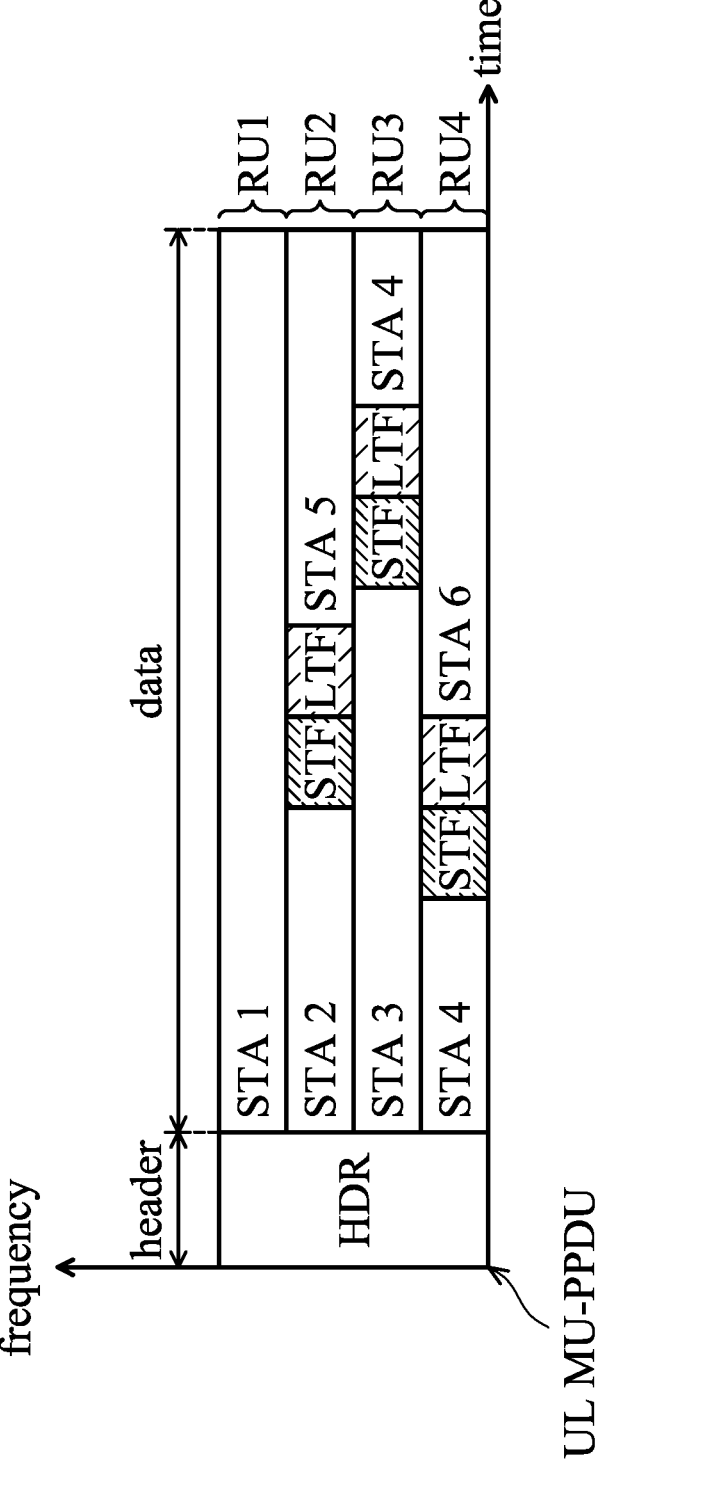
FIG. 8 is a schematic diagram illustrating the RU allocation of a UL MU-PPDU according to an embodiment of the application.

FIG. 8 is a schematic diagram illustrating the RU allocation of a UL MU-PPDU according to an embodiment of the application.

As shown in FIG. 8, the data field of the UL MU-PPDU may include multiple RUs (e.g., 4 RUs). Specifically, RU1 is allocated to STA 1 alone, RU2 is allocated to STAs 2 and 5, RU3 is allocated to STAs 3 and 4, and RU4 is allocated to STAs 4 and 6.

Please note that, in this embodiment, an STA may be allocated with multiple user blocks in different RUs, and the user blocks for the same STA in different RUs is not allowed to overlap in the time domain. For example, STA 4 is allocated with the second user block in RU3 and the first user block in RU4, wherein the user block for STA 4 in RU3 and the user block for STA 4 in RU4 do not overlap in the time domain.

In addition, the user blocks allocated for different STAs in the same RU may be separated using a Short Training Field (STF) and a Long Training Field (LTF) to clarify the boundary of the user blocks for different STAs.

Figure 9:
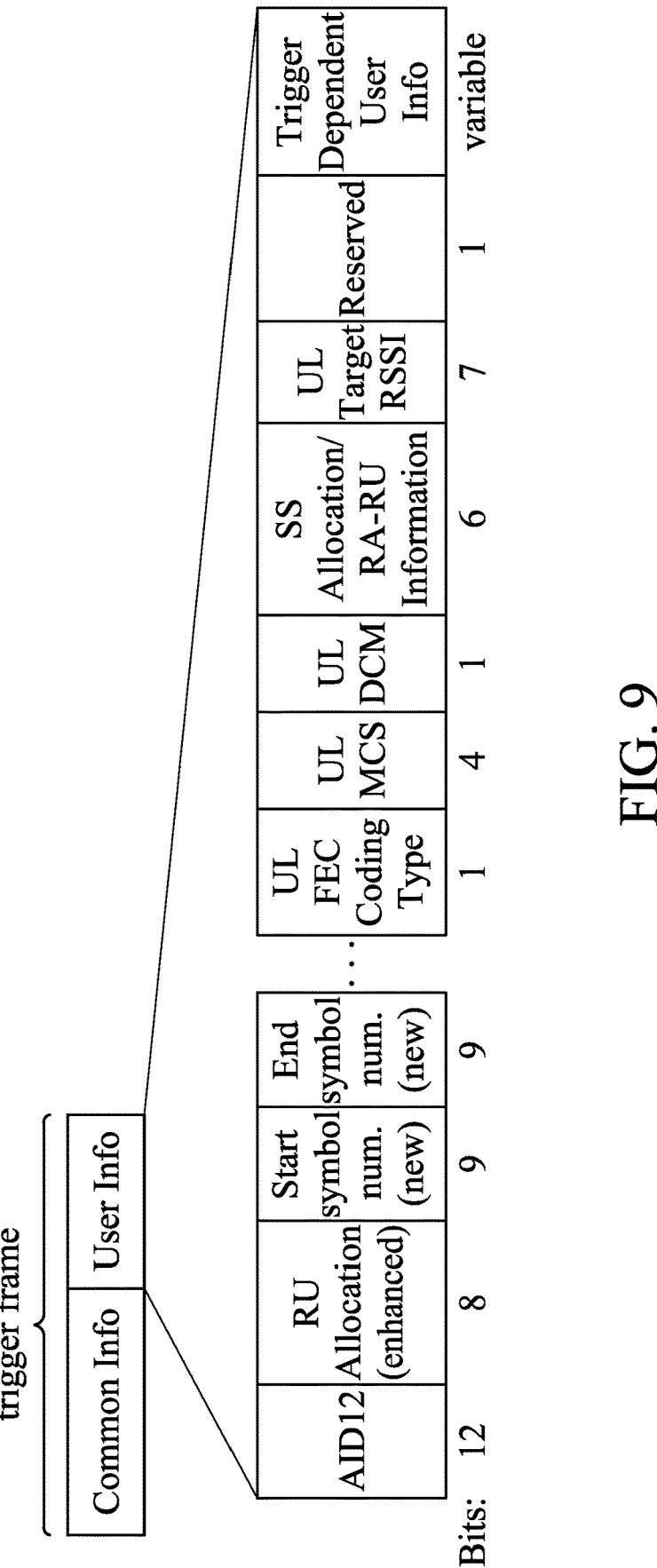
FIG. 9 is a schematic diagram illustrating the provision of the allocation information for RU allocation in a trigger frame of a PPDU according to an embodiment of the application.

FIG. 9 is a schematic diagram illustrating the provision of the allocation information for RU allocation in a trigger frame of a PPDU according to an embodiment of the application.

A trigger frame may be sent by an AP to multiple STAs to trigger them to send data in UL MU-PPDU(s).

As shown in FIG. 9, a trigger frame may include a common info field and a user info field. The user info field may include a plurality of subfields, wherein the RU Allocation subfield may be enhanced as the embodiment of FIG. 7 and a plurality of new subfields may be introduced to indicate the start symbol number and the end symbol number of each user block in an RU of the UL MU-PPDU.

According to an embodiment of the invention, the allocation information may indicate at least one user block and at least one stream for each STA. The RUs may be configured in a Multi-User Multiple Input Multiple Output Physical layer Protocol Data Unit (MU-MIMO PPDU) or an one-user PPDU. That is, each RU in PPDU may comprise at least one user block.

According to an embodiment of the invention, the user blocks assigned to each STA may be at different RUs, in different time slots or in different spatial streams.

According to an embodiment of the invention, the allocation information may further indicate at least one modulation and coding scheme (MCS) and at least one spatial stream (i.e., the number of the spatial streams (Nss)) for the STA. Specifically, in one user block assigned to one STA, the allocation information may indicate which MCS the STA should use and indicate the number of spatial streams the STA can use. The MCS and the Nss assigned to the STA may be the same or different at different RUs, in different time slots or in different spatial streams. Details are discussed below with reference to FIG. 10. In another embodiment, the MCS and the Nss may be indicated through other link or other packets from another AP or other APs. For example, the information or data (e.g., MCS and Nss) in the allocation information may be included in one packet or in two packets (or two links) from other APs.

According to an embodiment of the invention, the MCS and the Nss assigned to the STA may be selected based on at least one of Quality of Service (QoS), channel quality, throughput, but the invention should not be limited thereto.

Figures 10, 11A:
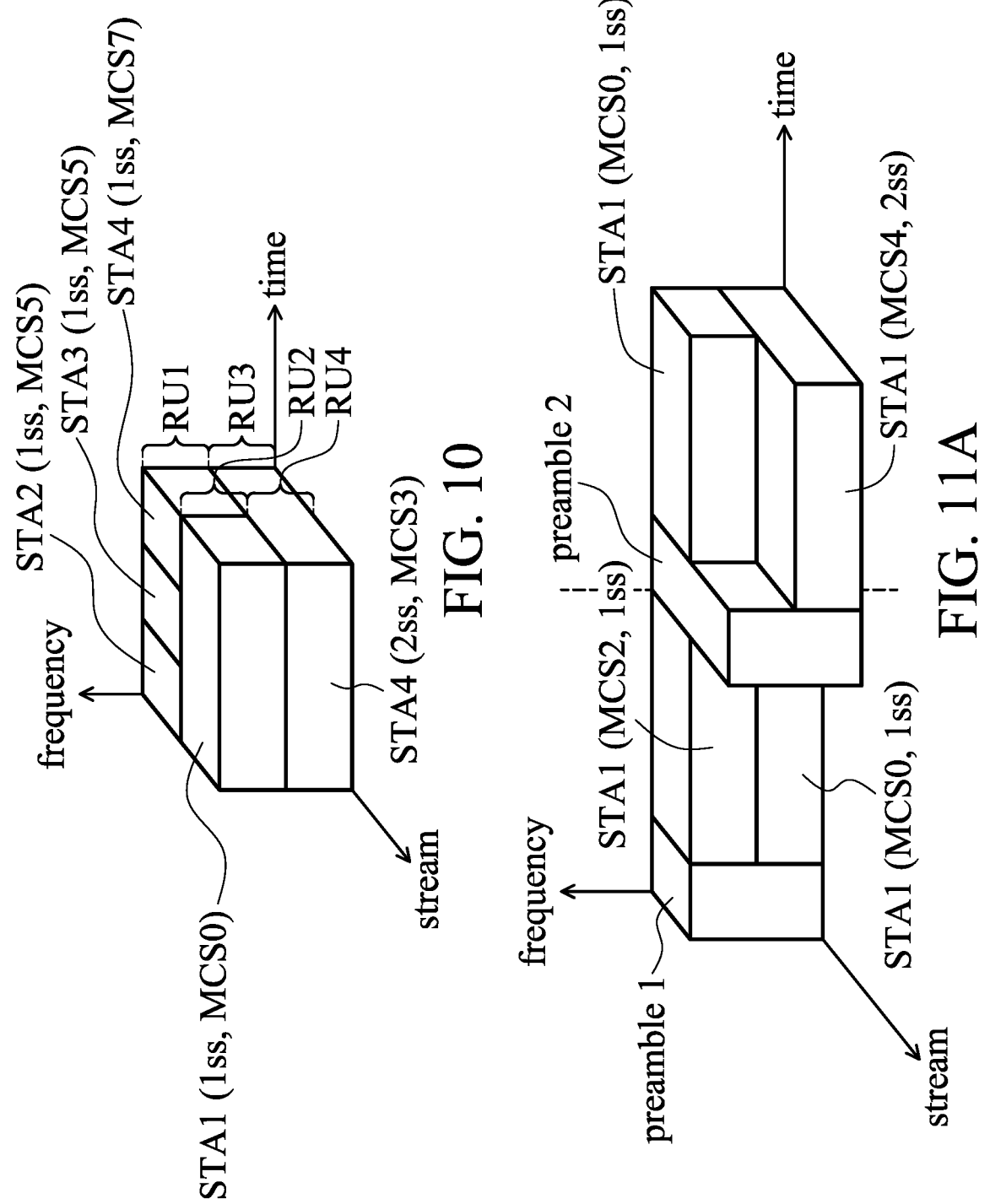
FIG. 10 is a schematic diagram illustrating the RU allocation of a MU-MIMO PPDU according to an embodiment of the application.
FIG. 11A is a schematic diagram illustrating a preamble allocation in a MU-MIMO PPDU according to an embodiment of the application.

FIG. 10 is a schematic diagram illustrating the RU allocation of a MU-MIMO PPDU according to an embodiment of the application. As shown in FIG. 10, the data field of the MU-MIMO PPDU may include multiple RUs (e.g., 4 RUs). Specifically, RU1 is allocated to STA 2, STA 3 and STA 4, RU2 is allocated to STA 1 alone, RU3 and RU 4 are allocated to STA 4. To further clarify, RU 1 is divided into multiple user blocks, each of which is allocated to a respective STA. In other words, multiple STAs are allowed to share a single RU in an MU-MIMO PPDU.

In addition, as shown in FIG. 10, at RU1, MCS5 and one spatial stream (1ss) are assigned to STA 2, MCS5 and one spatial stream (1ss) are assigned to STA 3, and MCS7 and one spatial stream (1ss) are assigned to STA 4. At RU2, MCS0 and one spatial stream (1ss) is assigned to STA 1. At RU2 and RU3, MCS3 and two spatial streams (2ss) are assigned to STA 4.

It should be noted that, the schematic diagram of FIG. 10 is only used as an example for illustrating the embodiments of the invention, but the invention should not be limited thereto.

According to an embodiment, the allocation information may be configured in at least one preamble in the MU-MIMO PPDU. In an example, the preamble may comprise more signal (SIG) field, long training field (LTF) and short training field (STF). In another example, the preamble may comprise LTF and STF. In another example, the preamble may only comprise LTF.

Figures 11B, 11C:
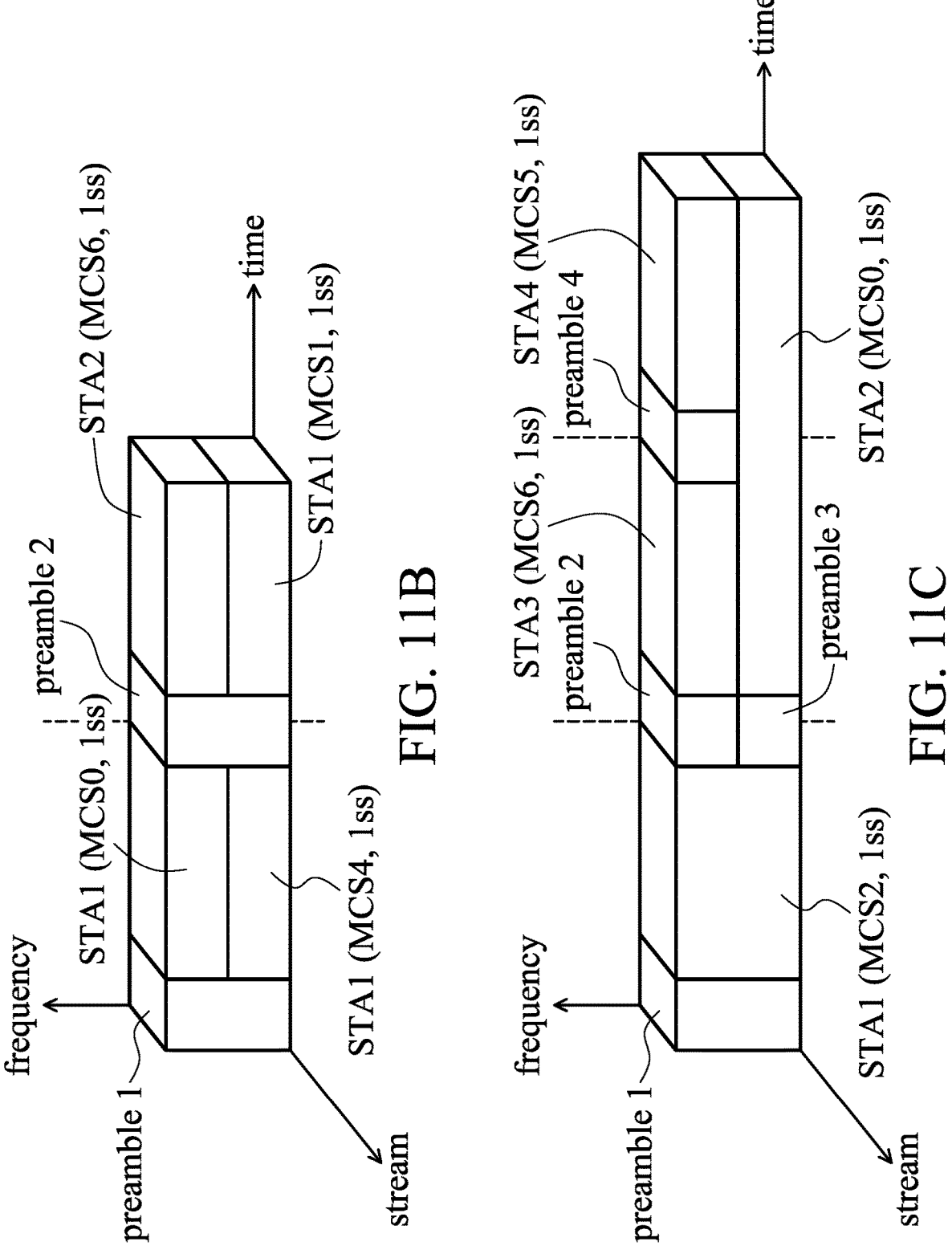
FIG. 11B is a schematic diagram illustrating a preamble allocation in a MU-MIMO PPDU according to another embodiment of the application.
FIG. 11C is a schematic diagram illustrating a preamble allocation in a MU-MIMO PPDU according to another embodiment of the application.

According to an embodiment, the preamble may be inserted in the MU-MIMO PPDU in response to the allocation information being different in two time slots. Specifically, in the embodiment, when the resource allocation in the MU-MIMO PPDU in the next time slot is to be changed, a preamble will be inserted in the MU-MIMO PPDU. The allocation information change may comprise the assigned MCS being changed in the next time slot, the assigned RU (or RU size) being changed in the next time slot, the STA being changed in the next time slot, or the number of assigned spatial streams being changed in the next time slot, but the invention should not be limited thereto. In the embodiment, the preamble may comprise a SIG field, LTF and STF. FIGS. 11A~11C are used as examples to illustrate the embodiment below.

As shown in FIG. 11A, in the first time slot, at an RU (or user block), the STA 1 is assigned MCS2 and one spatial stream (1ss) and at the other RU (or user block), the STA 1 is assigned MCS0 and one spatial stream (1ss). In the second time slot, at an RU (or user block), the STA 1 is assigned MCS0 and one spatial stream (1ss) and at the other RU (or user block), the STA 1 is assigned MCS4 and two spatial streams (2ss). A preamble 1 is inserted in the head of the MU-MIMO PPDU. Because the allocation information (i.e., MCS and the number of spatial streams) has been changed in the second time slot, a preamble 2 will be inserted in the front of the RUs of the MU-MIMO PPDU in the second time slot.

As shown in FIG. 11B, in the first time slot, at an RU (or user block), the STA 1 is assigned MCS0 and one spatial stream (1ss) and at the other RU (or user block), the STA 1 is assigned MCS4 and one spatial stream (1ss). In the second time slot, at an RU (or user block), the STA 2 is assigned MCS6 and one spatial stream (1ss) and in the other RU (or user block), the STA 1 is assigned MCS1 and one spatial stream (1ss). A preamble 1 is inserted in the head of the MU-MIMO PPDU. Because the allocation information (i.e., MCS and STA) has been changed in the second time slot, a preamble 2 will be inserted in the front of the RUs of the MU-MIMO PPDU in the second time slot.

As shown in FIG. 11C, in the first time slot, at the RU (or user block), the STA 1 is assigned MCS2 and one spatial stream (1ss). In the second time slot, at an RU (or user block), the STA 3 is assigned MCS6 and one spatial stream (1ss) and at the other RU (or user block), the STA 2 is assigned MCS0 and one spatial stream (1ss). In the third time slot, at an RU (or user block), the STA 4 is assigned MCS5 and one spatial stream (1ss) and at the other RU (or user block), the STA 2 is assigned MCS0 and one spatial stream (1ss). A preamble 1 is inserted in the head of the MU-MIMO PPDU. Because the allocation information (i.e., MCS, RU size and STA) has been changed in the second time slot, a preamble 2 and a preamble 3 will be inserted in the front of the RUs of the MU-MIMO PPDU in the second time slot. In addition, because the allocation information (i.e., MCS and STA) has been changed in the third time slot, a preamble 4 will be inserted in the front of the RU of the MU-MIMO PPDU in the third time slot. It should be noted that, because at the second time slot and the third time slot, the allocation information for STA 2 are not changed, the RU (or user block) allocated to STA 2 can be combined, and at the third time slot, the preamble for the STA 2 will not be inserted in the MU-MIMO PPDU.

It should be noted that, the schematic diagram of FIGS. 11A-11C are only used as examples to illustrate the embodiment of the invention, but the invention should not be limited thereto.

Figures 12, 13:
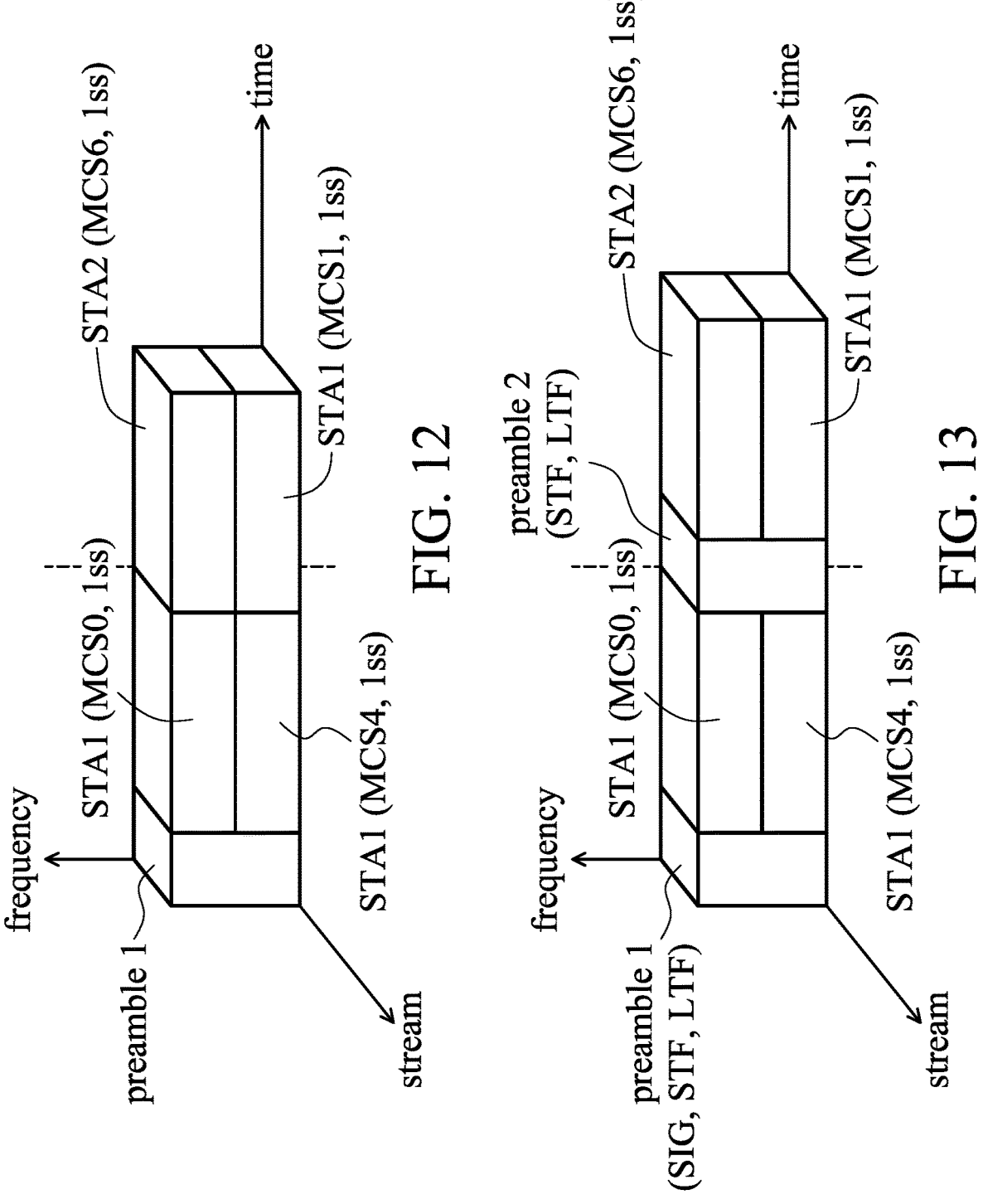
FIG. 12 is a schematic diagram illustrating a preamble allocation in a MU-MIMO PPDU according to another embodiment of the application.
FIG. 13 is a schematic diagram illustrating a preamble allocation in a MU-MIMO PPDU according to another embodiment of the application.

According to another embodiment, there is only one preamble configured in the head of the MU-MIMO PPDU. That is to say, in the embodiment all allocation information is configured in a preamble. Even if the allocation information is different in two time slots, other preambles will not be inserted in the MU-MIMO PPDU. In the embodiment, the preamble may comprise a SIG field, LTF and STF. FIG. 12 illustrates an example that illustrates the embodiment below.

As shown in FIG. 12, in the first time slot, at an RU (or user block), the STA 1 is assigned MCS0 and one spatial stream (1ss) and at the other RU (or user block), the STA 1 is assigned MCS4 and one spatial stream (1ss). In the second time slot, at an RU (or user block), the STA 2 is assigned MCS6 and one spatial stream (1ss) and at the other RU (or user block), the STA 1 is assigned MCS1 and one spatial stream (1ss). The preamble 1 is inserted in the head of the MU-MIMO PPDU, i.e., the MU-MIMO PPDU only comprise one preamble.

According to another embodiment, a first preamble configured in the head of the MU-MIMO PPDU comprises a signal (SIG) field and other preambles configured in the MU-MIMO PPDU do not comprise a SIG field. That is to say, in the embodiment, only the first preamble in the head of the MU-MIMO PPDU comprises SIG field, LTF and STF. Other preambles in the MU-MIMO PPDU may only comprise LTF and STF. FIG. 13 illustrates an example of the embodiment below.

It should be noted that, the schematic diagram of FIG. 12 is only used as examples to illustrate the embodiment of the invention, but the invention should not be limited thereto.

As shown in FIG. 13, in the first time slot, at an RU (or user block), the STA 1 is assigned MCS0 and one spatial stream (1ss) and at the other RU (or user block), the STA 1 is assigned MCS4 and one spatial stream (1ss). In the second time slot, at an RU (or user block), the STA 2 is assigned MCS6 and one spatial stream (1ss) and at the other RU (or user block), the STA 1 is assigned MCS1 and one spatial stream (1ss). The preamble 1 is inserted in the head of the MU-MIMO PPDU. Because the allocation information (i.e., MCS and STA) has been changed in the second time slot, the preamble 2 will be inserted in the front of the RUs of the MU-MIMO PPDU in the second time slot. In FIG. 13, the preamble 1 comprises SIG field, LTF and STF, but the preamble 2 only comprises LTF and STF.

It should be noted that, the schematic diagram of FIG. 13 is only used as an example to illustrate the embodiment of the invention, but the invention should not be limited thereto.

Figure 14:
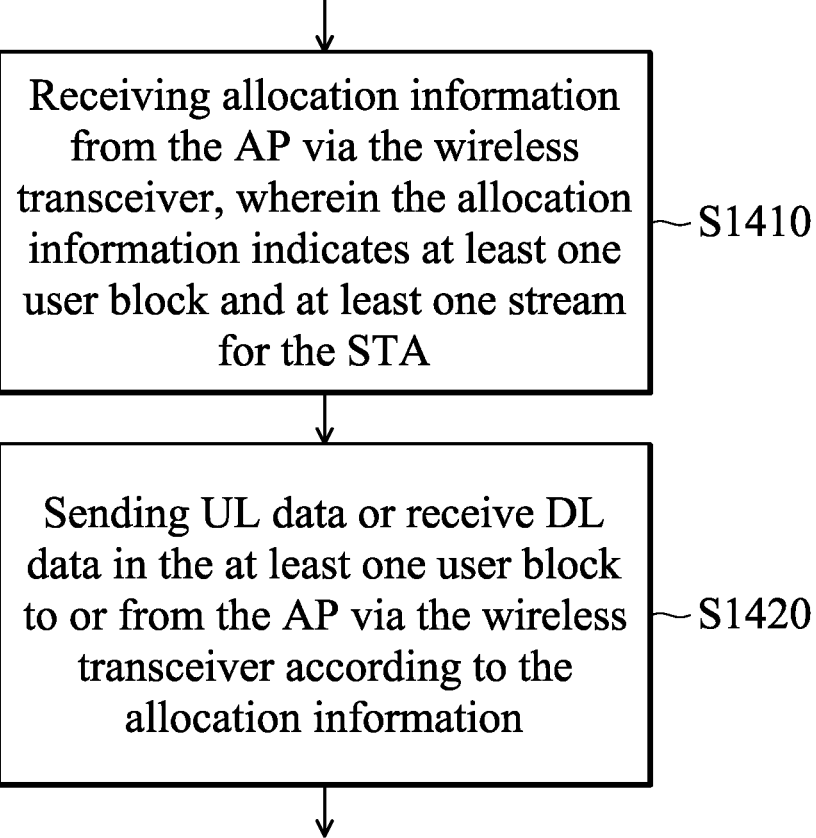
FIG. 14 is a flow chart illustrating a method for flexible RU allocation according to an embodiment of the application.

FIG. 14 is a flow chart illustrating a method for flexible RU allocation according to an embodiment of the application. In step S1410, a STA receives allocation information from an AP via the wireless transceiver of the STA, wherein the allocation information indicates at least one user block and at least one stream for the STA. Each resource unit (RU) in a Physical layer Protocol Data Unit (PPDU) may comprise at least one user block.

In step S1420, the STA sends Uplink (UL) data or receives Downlink (DL) data in the at least one user block to or from the AP via the wireless transceiver according to the allocation information.

In view of the forgoing embodiments, it will be appreciated that the present application realizes flexible RU allocation for IEEE 802.11 (e.g., 802.11be) systems, by allowing multiple STAs to share one RU in an MU-PPDU. Advantageously, each RU can be more efficiently used among the multiple STAs aggregated in an MU-PPDU for OFDMA transmission, thereby improving radio resource utilization and overall system performance.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A station (STA) for communicating with an Access Point (AP) in a wireless communication system, comprising:
   a wireless transceiver, configured to perform wireless transmission and reception to and from the AP; and
   a processor, configured to:
   receive allocation information from the AP via the wireless transceiver, wherein the allocation information indicates at least one user block and at least one stream for the STA, wherein each resource unit (RU) in a Physical layer Protocol Data Unit (PPDU) comprises at least one user block, wherein the allocation information is configured in at least one preamble in the PPDU, wherein a first preamble configured in a head of the PPDU comprises a signal (SIG) field and other preambles configured in the PPDU do not comprise the SIG field; and
   send Uplink (UL) data or receive Downlink (DL) data in the at least one user block to or from the AP via the wireless transceiver according to the allocation information.

2. The STA as claimed in claim 1, wherein the user blocks assigned to the STA are at different RUs, in different time slots or in different spatial streams.

3. The STA as claimed in claim 2, wherein the allocation information further indicates at least one modulation and coding scheme (MCS) and at least one spatial stream for the STA, wherein the MCS and the number of the spatial streams for the STA are the same or different at different RUs, in different time slots or in different spatial streams.

4. The STA as claimed in claim 1, wherein the at least one preamble is inserted in the PPDU in response to the allocation information being different in two time slots.

5. The STA as claimed in claim 1, wherein there is only one preamble configured in a head of the PPDU.

6. A method, executed by a station (STA) for communicating with an Access Point (AP) in a wireless communication system, the method comprising:

receiving, by the STA, allocation information from the AP via the wireless transceiver, wherein the allocation information indicates at least one user block and at least one stream for the STA, wherein each resource unit (RU) in a Physical layer Protocol Data Unit (PPDU) comprises at least one user block, wherein the allocation information is configured in at least one preamble in the PPDU, wherein a first preamble configured in a head of the PPDU comprises a signal (SIG) field and other preambles configured in the PPDU do not comprise the SIG field; and sending, by the STA, Uplink (UL) data or receive Downlink (DL) data in the at least one user block to or from the AP via the wireless transceiver according to the allocation information.

7. The method as claimed in claim 6, wherein the user blocks assigned to the STA are at different RUs, in different time slots or in different spatial streams.

8. The method as claimed in claim 7, wherein the allocation information further indicates at least one modulation and coding scheme (MCS) and at least one spatial stream for the STA, wherein the MCS and the number of the spatial streams for the STA are the same or different at different RUs, in different time slots or in different spatial streams.

9. The method as claimed in claim 6, wherein the at least one preamble is inserted in the PPDU in response to the allocation information being different in two time slots.

10. The method as claimed in claim 6, wherein there is only one preamble configured in a head of the PPDU.

11. An Access Point (AP) for communicating with a plurality of stations (STA) in a wireless communication system, comprising:

a wireless transceiver, configured to perform wireless transmission and reception to and from the STAs; and a processor, configured to:

send allocation information to the STAs via the wireless transceiver, wherein the allocation information indicates at least one user block and at least one stream for each STA, wherein each resource unit (RU) in a Physical layer Protocol Data Unit (PPDU) comprises at least one user block, wherein the allocation information is configured in at least one preamble in the PPDU, wherein a first preamble configured in a head of the PPDU comprises a signal (SIG) field and other preambles configured in the PPDU do not comprise the SIG field; and receive Uplink (UL) data or send Downlink (DL) data in the at least one user block from or to each STA via the wireless transceiver according to the allocation information.

12. The AP as claimed in claim 11, wherein the user blocks assigned to each STA are at different RUs, in different time slots or in different spatial streams, and wherein the allocation information further indicates at least one modulation and coding scheme (MCS) and at least one spatial stream for each STA, wherein the MCS and the number of the spatial streams for each STA are the same or different at different RUs, in different time slots or in different spatial streams.

13. The AP as claimed in claim 11, wherein the at least one preamble is inserted in the PPDU in response to the allocation information being different in two time slots.

14. The AP as claimed in claim 11, wherein there is only one preamble configured in a head of the PPDU.

* * * * *